United States Patent [19]

Swift et al.

[11] 4,242,819

[45] Jan. 6, 1981

[54] MICROFICHE CARRIER ASSEMBLY

[75] Inventors: William R. Swift, Placentia; Clyde E. LeFevre, Orange, both of Calif.

[73] Assignee: AM International, Inc., Los Angeles, Calif.

[21] Appl. No.: 907,906

[22] Filed: May 22, 1978

[51] Int. Cl.³ .............................................. G09F 11/30
[52] U.S. Cl. ...................................... 40/513; 40/372; 40/373; 209/608; 428/40; 428/57; 428/61
[58] Field of Search .......... 40/513, 509, 510, 530–531, 40/535–537, 492, 372–375, 377, 379, 380, 383, 403, 404, 359, 360, 158 R, 158 B, 159; 209/608, 610, 612; 428/40, 57, 61, 132

[56] References Cited

U.S. PATENT DOCUMENTS

| | | | |
|---|---|---|---|
| 867,618 | 10/1907 | Stretch | 209/608 |
| 867,930 | 10/1907 | Stretch | 209/608 |
| 1,727,453 | 9/1929 | Tockhorn | 209/608 |
| 3,444,635 | 5/1969 | Setzler | 40/360 |
| 3,530,985 | 9/1970 | Voss et al. | 209/608 |
| 3,535,804 | 10/1970 | Cunningham | 40/2 R |
| 3,732,977 | 5/1973 | Deprez et al. | 209/612 |
| 3,902,662 | 9/1975 | Oushige et al. | 209/608 X |
| 3,908,829 | 9/1975 | Müller et al. | 209/612 |
| 3,991,497 | 11/1976 | Owens et al. | 40/383 |
| 4,127,690 | 11/1978 | Schleifenbaum et al. | 40/360 |

*Primary Examiner*—Gene Mancene
*Attorney, Agent, or Firm*—A. W. Karambelas; R. C. Curfiss

[57] ABSTRACT

A microfiche carrier assembly is provided comprising a core of flexible but relatively rigid sheet material having a thin cover sheet provided with an adhesive surface for securing the cover sheet to the core so as to seal both faces and one end of the core. The cover sheet extends beyond the other end of the core to provide overhanging flaps forming a pocket therebetween with the adhesive surfaces of the flaps facing inwardly. A marginal edge of a microfiche is positioned in the pocket and is secured therein by the flaps. The microfiche carrier assembly is also provided with selector means in the form of a perforation at a predetermined location in a selector field to permit retrieval of a selected microfiche from a deck of microfiche carrier assemblies contained, for example, in a magazine.

9 Claims, 11 Drawing Figures

MICROFICHE CARRIER ASSEMBLY

BACKGROUND OF THE INVENTION

Because of the present day "information explosion", data are being accumulated at such a rapid rate that compact data storage systems are becoming ever more important. One of the most satisfactory data storage systems thus far devised is that of microfilming, wherein sheets of data, reports, books, blueprints, pictures and the like are photographed in a photographically reduced size. Typically, an entire page then requires an area of about one half inch by five eighths of an inch. These reduced size frames are then suitably assembled. This system results in a tremendous compaction of storage space requirements.

One of the early methods of assembling these reduced size frames was to position them tandem-wise, on a reel of film, but this system had the disadvantage that it became difficult to have access to a single frame without somehow going through every frame that preceded it on the reel.

Another method of assembling the reduced size frames was to print related frames onto a given sheet of film, and this became known as microfiche. In using the microfiche, a single frame is more readily retrieved when desired, providing random access to the desired frame.

The microfiche, during its evolution, has taken a number of different sizes. One of the most popular sizes is about 6 inches long and about 4 inches wide. This size of microfiche may be designed to contain from about 60 to over 400 frames. Other sizes are also in use. The diversity of microfiche has hindered the storing and retrieval of microfiche stored data.

An attempt at retrieving microfiche involved attaching a notched metal clip to one edge of the microfiche, the notches being coded for use in data retrieval. Another arrangement wherein the edge of the microfiche includes coding formed by a series of holes and notches is shown in U.S. Pat. No. 3,831,749. Some other arrangements used optical approaches and still other arrangements used markings to produce a frequency signal.

The main disadvantage of the foregoing arrangements was that they required additional equipment and procedures for manufacturing each type of microfiche. Since each arrangement required different retrieval apparatus, it was extremely difficult to intermix microfiche from different sources.

Another microfiche carrier is disclosed in U.S. Pat. No. 3,807,074 assigned to the same assignee. As shown therein, the carrier takes the form of a plate having a transparent portion adapted to receive a microfiche. The carrier plate may be formed by producing a pocket in a sheet of transparent material. The resultant microfiche carrier is a relatively rigid plate containing a microfiche positioned in its transparent portion.

A cartridge or magazine for microfiche is disclosed in U.S. Pat. No. 3,991,497 assigned to the same assignee as the present invention. As shown therein, the magazine comprises a pair of side walls, each of which is formed with an elongated arcuate protrusion, a top, a bottom and a front wall having a window therein. The back of the magazine is open to receive a deck of microfiche carriers. Each of the carriers is provided with detent means which coact with the arcuate protrusions for releasably holding the microfiche carriers in place in the magazine, and coding tab means adapted to be acted upon by pusher means for partially ejecting a selected microfiche from the open back of the magazine.

SUMMARY OF THE INVENTION

The present invention relates to a microfiche carrier assembly provided with selector means for retrieving a selected microfiche from a deck of such microfiche carrier assemblies.

The microfiche carrier assembly comprises a relatively rigid core sheet enclosed within a thin, adhesively coated cover sheet providing flaps overhanging one end of the core sheet for securing a microfiche thereto, and may include detent means for releasably retaining the microfiche carrier assembly in place in a magazine.

The selector means comprises a perforation provided at a selected predetermined position within a selector field of each carrier assembly, in association with a plurality of elongate slots positioned in alignment with corresponding slots provided in a bottom of a magazine in which the deck of microfiche carrier assemblies is contained.

The perforation of the selector means is adapted to be engaged by an interposer, either manually or automatically, for partial withdrawal of a selected microfiche carrier assembly from the deck of microfiche carrier assemblies contained in the magazine. The interposer is adapted to be positioned in a selected slot in the bottom of the magazine, moved through an elongate slot in each of the carrier assemblies which is in alignment with the slot in the bottom of the magazine and into engagement with the perforation in the selected microfiche carrier assembly. Thereafter, the interposer is moved in a direction to partially eject the microfiche for viewing and, after viewing, is moved in the opposite direction to restore the microfiche to the deck in the magazine and withdrawn from the perforation and the slots.

It is an object of the present invention to provide an improved microfiche carrier assembly adapted for use in a deck of carrier assemblies, for retrieval of a selected microfiche carrier assembly from the deck of carrier assemblies.

Another object is to provide selector means in the carrier assembly which increases the useful life of the carrier assembly.

Another object is to provide an improved microfiche carrier assembly in which the microfiche is adhesively secured to the carrier to produce a thin carrier assembly affording increased packing density of the carrier assemblies.

Another object is to provide a microfiche carrier assembly provided with detent means coactable with means on the magazine for releasably retaining the microfiche carrier assembly in the magazine.

A feature of the invention is to provide a microfiche carrier assembly which is simple in construction and economical to produce.

Other objects, features and advantages of the invention will appear hereinafter as the description proceeds.

IN THE DRAWING

DESCRIPTION OF THE PREFERRED EMBODIMENT

Figure 1:
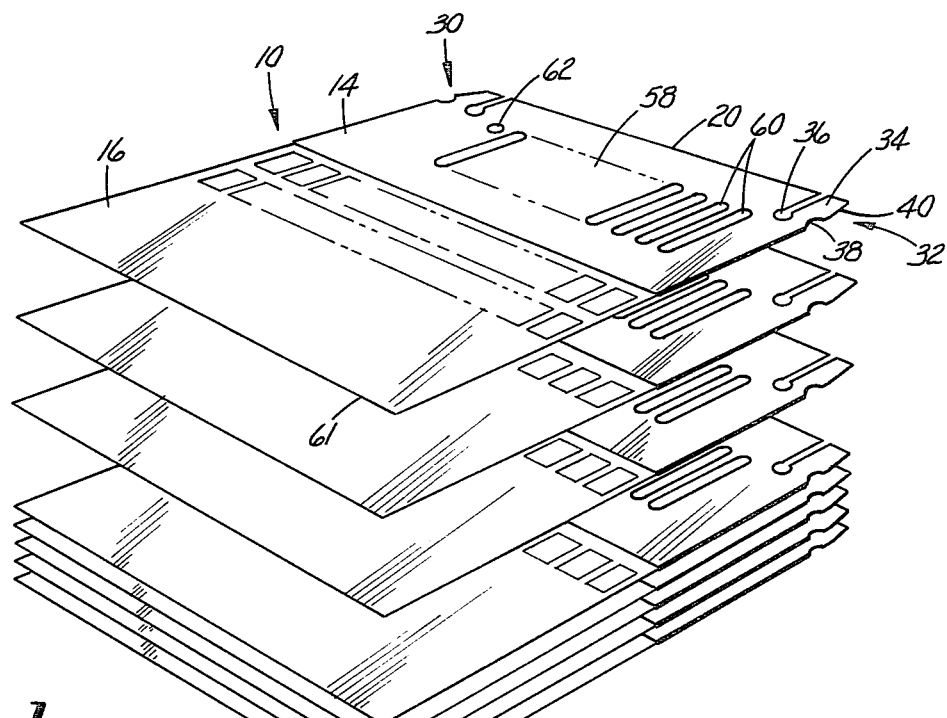
FIG. 1 is an exploded perspective view of a deck of microfiche carrier assemblies and a magazine, partially broken away, for holding the deck of carrier assemblies in accordance with the present invention.

With reference to FIG. 1, there is shown a plurality of microfiche carrier assemblies indicated generally by the reference numeral 10 and a cartridge or magazine indicated generally by the reference numeral 12 for holding a deck of microfiche carrier assemblies. The microfiche carrier assembly 10 comprises a generally rectangular sheet of relatively rigid material defining a carrier 14 and a microfiche 16 secured thereto.

Figure 3:
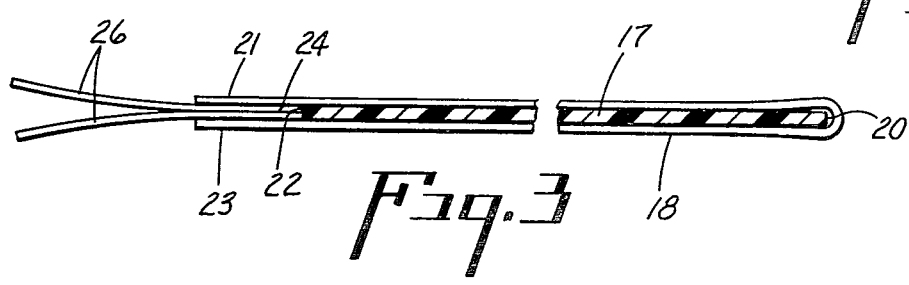
FIG. 3 is a sectional side elevation of a carrier of the microfiche carrier assembly, on an enlarged scale.

As shown in FIG. 3, the carrier 14 comprises a plastic core 17 and a thin polyester cover sheet 18 adhesively secured to both sides or faces of the core. A lead edge 20 of the core 17 is enclosed by the cover sheet 18 which provides a formed radius therearound. The formed radius facilitates the return of the microfiche carrier assembly 10 to the deck in the magazine 12 without interference with adjacent carriers in the deck, as would be encountered if the lead edge 20 were square. The cover sheet 18 extends over an edge 22 of the core 17 to afford a pair of flaps 21 and 23 overhanging the rear edge 22, with the pressure sensitive adhesive surfaces of the flaps facing inwardly, to provide a pocket 24 therebetween. The adhesive surfaces of the flaps 21 and 23 are protected with removable cover strips 26 of paper or the like to prevent offset of the adhesive until such time as the microfiche 16 is to be secured to the carrier 14.

Figure 4:
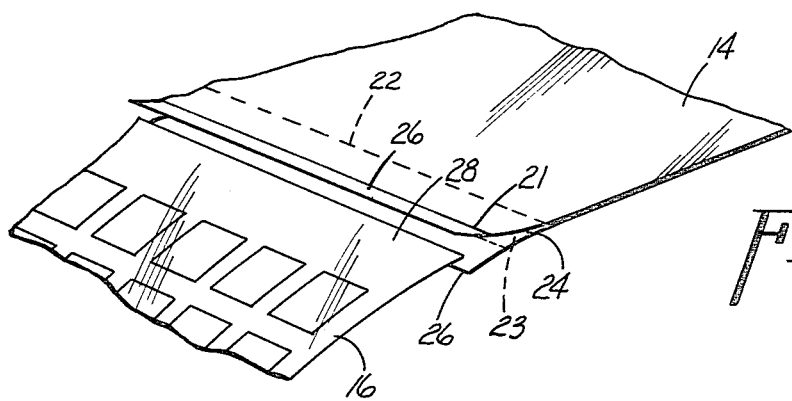
FIGS. 4, 4a and 4b are fragmentary perspective views illustrating assembly of a microfiche to a carrier.
Figure 4A:
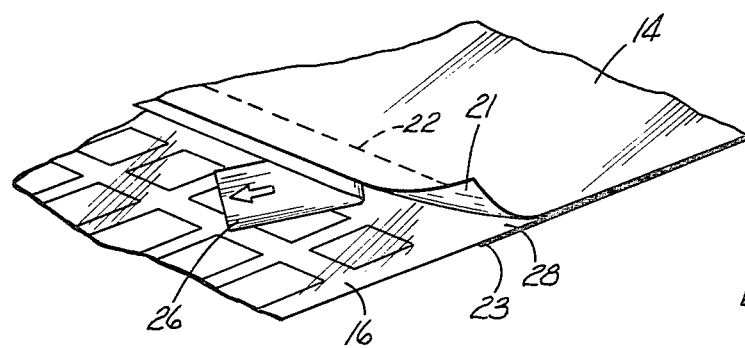
Figure 4B:
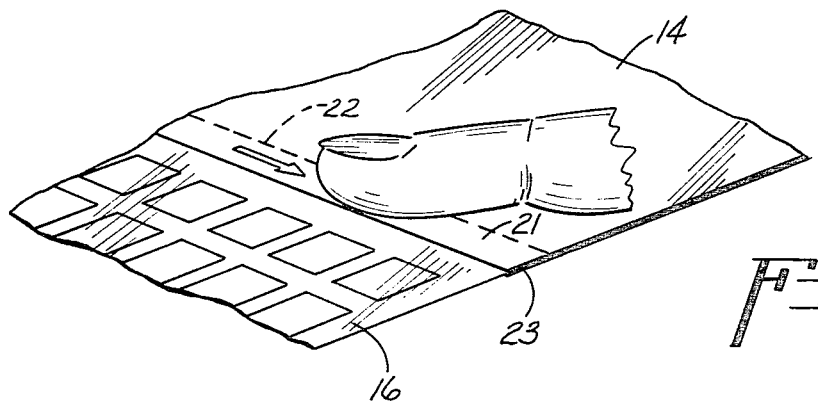

As shown in FIGS. 4, 4a and 4b, the microfiche 16 is assembled or secured to the carrier 14 by positioning a marginal edge 28 of the microfiche in the pocket 24 between the cover strips 26 and up against the rear edge 22 of the core, removing the cover strips 26 and pressing the flaps 21 and 23 against the marginal edge 28 to thereby adhesively secure the microfiche 16 to the carrier 14 as illustrated in FIG. 4b.

This construction of the microfiche carrier assembly 10 reduces the cost over existing two-sided carrier assemblies and permits fabrication of relatively thin carrier assemblies which allows for increased packing density of the carrier assemblies in the magazine 12. For example, it has been found that a suitable carrier assembly may be constructed with an overall thickness of about eleven mils, wherein the core 17 is seven mils thick, the cover sheet 18 one mil thick and the adhesive between the core faces and the cover sheet another one mil thick. Such overall thickness of the carrier assembly is substantially less than known two-sided carrier assemblies currently in use.

Figure 2:
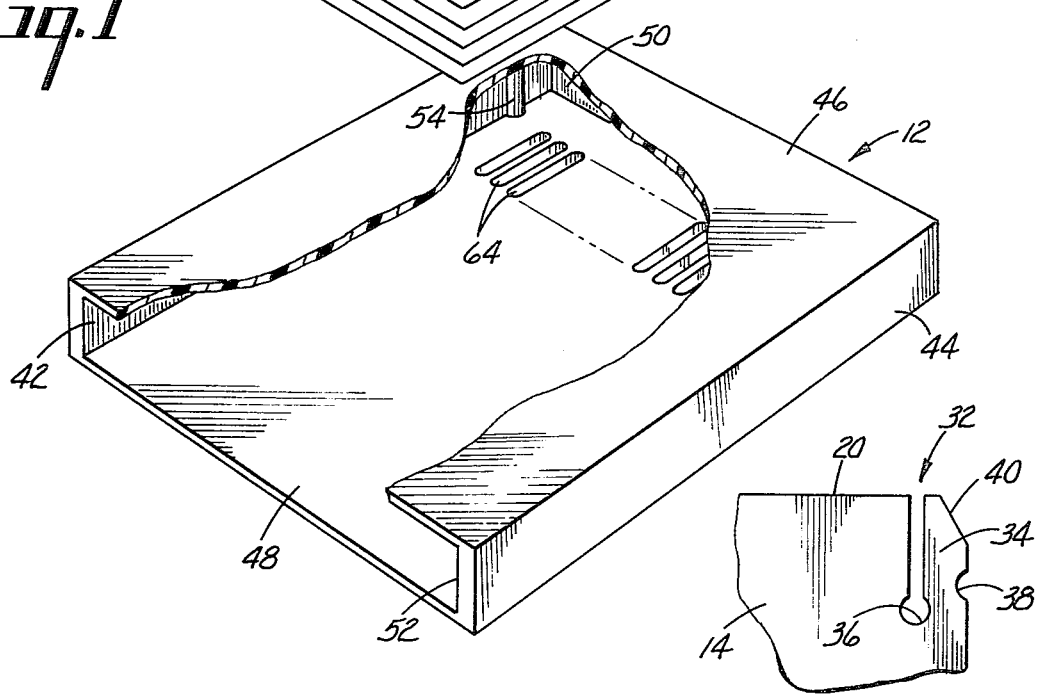
FIG. 2 is a fragmented plan view, on an enlarged scale, of a detent means for releasably holding the carrier assembly in the magazine.

With reference to FIGS. 1 and 2, the carrier 14 is provided with a pair of detent elements indicated generally by the reference numerals 30 and 32 positioned at respective corners of the lead edge 20 of the carrier. Each detent element includes an outer flexible leg 34 adapted to flex transversely as a result of a key-hole slot 36. Also, each flexible leg 34 is provided on its outer edge with a detent concavity 38 and at its outer end portion with a chamfer 40.

The magazine 12 comprises side walls 42 and 44, a top wall 46, a bottom 48, a front wall 50 and an open back 52. The side walls 42 and 44 include vertically extending protruding arcuate complementary detent elements 54, only one detent element 54 being shown on the side wall 42 in FIG. 1.

The magazine 12 is loaded by inserting a deck of microfiche carrier assemblies 10 into the open back 52 with the lead edge 20 of the carrier adjacent the front wall 50. In response to the chamfers 40 abutting the detent elements 54, the flexible legs 34 flex inwardly until the movement of the microfiche carrier assembly 10 causes the detent elements 54 to engage the detent concavities 38 of the flexible legs 34 and releasably hold each of the microfiche carrier assemblies 10 in place in the magazine 12.

The selector or coding means to permit retrieval of a selected microfiche from the magazine is shown in FIG. 1 and comprises a selector field 58 providing a plurality of parallel elongate slots 60 in the carrier 14 extending in the direction of movement of the microfiche carrier assemblies 10 into and out of the deck in the magazine 12.

The selector field 58 on each carrier 14 is also provided with a perforation 62 adjacent one or more of the elongate slots 60 and in alignment with the end of the slot 60 adjacent the lead edge 20 of the carrier 14. The number of elongate slots 60 in each of the carriers 14 is one less than the total number of microfiche carriers in the deck in the magazine 12. Thus, the number of elongate slots 60 and the perforation 62 in each carrier is equal to the number of microfiche carriers 10 in the magazine 12.

The bottom 48 of the magazine 12 is provided with elongate slots 64, corresponding to the slots 60 in the carrier 14, equal in number to the number of microfiche carrier assemblies 10 in the magazine. The elongate slots 64 are in aligned relation with the slots 60 and with the perforations 62 of the selector field 58 in the carriers 14.

Although the coding means of the selector field 58 could be arranged in any suitable manner, and adapted to accommodate any number of microfiche carrier assemblies 10 as determined by the capacity of the magazine 12, for purposes of this disclosure the selector means will be described for use with a deck consisting of twenty-five microfiche carrier assemblies 10. Accordingly, the bottom 48 of the magazine 12 would be provided with twenty-five elongate slots 64 and the selector field 58 of each carrier 14 would be provided with twenty-four elongate slots 60 and one perforation 62.

Figure 6:
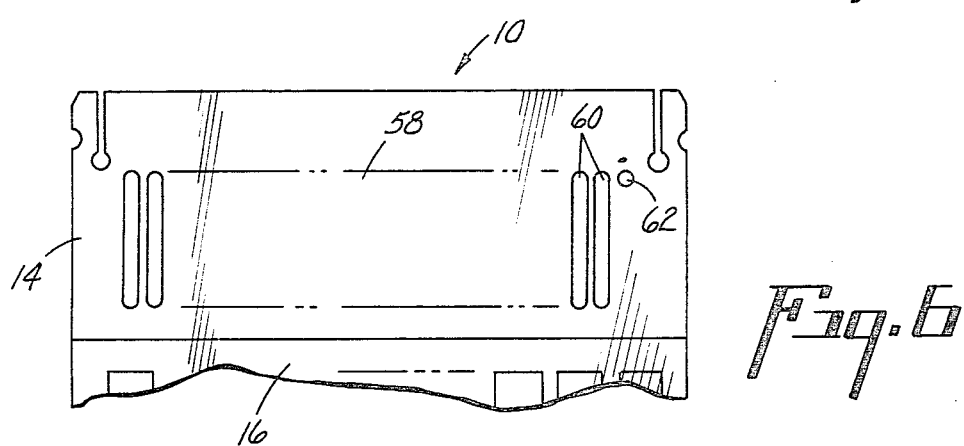
FIG. 6 shows a portion of a microfiche carrier assembly and a selector means.

With reference to FIG. 6, the perforation 62 may be positioned at any one of twenty-five locations in the selector field 58 of the carrier 14, with a slot 60 positioned at each of the remaining twenty-four positions. Each of the carriers 14 in the deck is coded in a similar manner by providing the perforation 62 at a predetermined position and slots 60 at the remaining positions such that no two carriers 14 in the deck have a perforation 62 at the same position.

The microfiche carrier assemblies 10 may be randomly positioned in the deck and all of the slots 60 in each of the carriers 14 are in vertical column alignment with corresponding slots 60 in other carriers and slots 64 in the bottom 48 of the magazine 12 respectively. Also, only a single perforation 62 of one of the carrier assemblies 10 in the deck will be aligned with each vertical column of slots 60 and 64. Thus, the predetermined location of the perforation 62 in each of the carriers 14 permits random retrieval of a selected microfiche from the magazine 12.

Although the "one" position of the perforation 62 may be located at either the left or right end of the selector field 58 followed by the other positions "two" through "twenty-five" in sequence, for purposes of this disclosure, in the example given hereinbelow, the "one" position of the perforation 62 is at the right end of the selector field as viewed in FIGS. 1 and 6. However, the carrier assembly 10 having the perforation 62 in the "one" position may be placed in the deck at any random position relative to the other carrier assemblies in the deck.

With reference to FIGS. 5, 5a, 5b and 5c, there is shown in schematic an arrangement comprising an interposer means 66 for partially withdrawing a selected microfiche carrier assembly 10 from the deck for viewing the microfiche 16 and for restoring the microfiche carrier assembly to the magazine 12. The interposer means 66 may be operated manually or automatically by any suitable mechanism. However, because the interposer means is not a part of the present invention, it is not described in detail herein other than to explain its relationship to the function of the selector field 58 for retrieving a selected microfiche carrier assembly from the magazine 12.

Still referring to FIGS. 5, 5a, 5b and 5c, the magazine 12 is positioned with its open back 52 adjacent a pair of rollers 68 for advancing a microfiche carrier assembly 10, partially ejected from the deck by the interposer means 66, to a viewing station 70. The viewing station 70 may be of conventional construction and adapted to move along X and Y axes to select a specific frame of the microfiche 16 to be viewed. After viewing of the microfiche 16, the rollers 68 are driven in the opposite direction for partially restoring the microfiche carrier assembly in the deck, whereupon the interposer means 66 is engaged with the carrier assembly to return the carrier assembly to its fully restored position in the magazine 12.

In operation, assuming it is desired to view the microfiche 16 having a perforation at the "two" position, the interposer means 66 is moved upwardly through the elongate slot 64 in the bottom 48 corresponding to the "two" position, i.e., the slot 64 second from the right end as viewed in FIG. 1. Continued movement of the interposer means 66 causes it to pass through the slot 60 in each of the carriers 14 in the deck which have a slot 60 at the location corresponding to the "two" position and into the perforation 62 of the carrier having the perforation at the "two" position. This is the microfiche 16 selected for withdrawal from the deck and viewing at the viewing station 70.

In this position, the interposer means 66 is moved in a direction to partially eject the selected microfiche carrier assembly 10 from the open back 52 and deliver a lead end 61 of the microfiche 16 to the rollers 68. The rollers 68 further advance the microfiche 16 to the viewing station 70, but do not remove the microfiche carrier assembly 10 completely from the deck, and the interposer means 66 is withdrawn from the carrier assembly.

Figure 5:
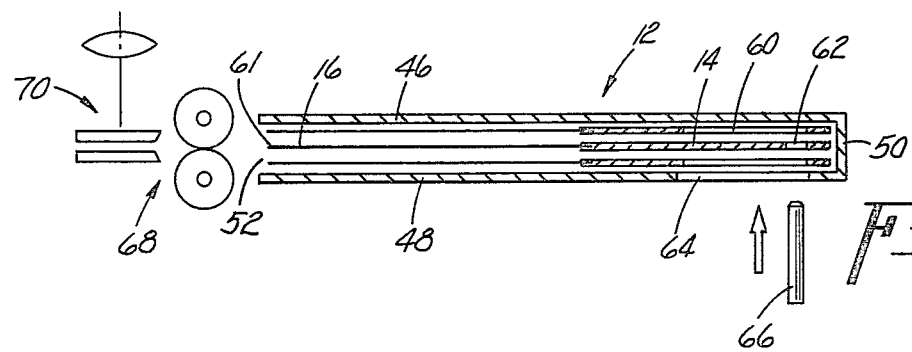
FIGS. 5, 5a, 5b and 5c are sectional side elevations of the magazine showing in schematic the retrieval of a selected microfiche from the magazine to a viewing station and return to the magazine.
Figure 5A:
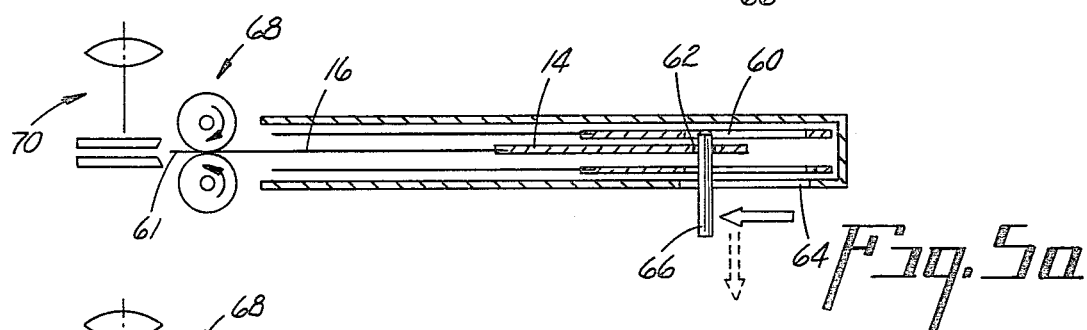
Figure 5B:
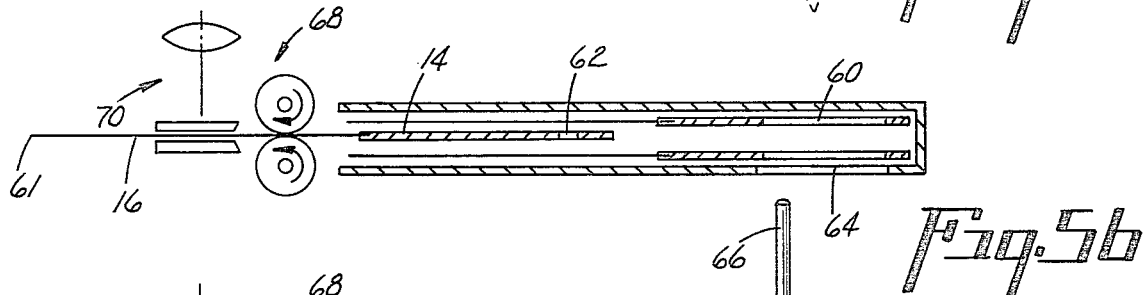
Figure 5C:
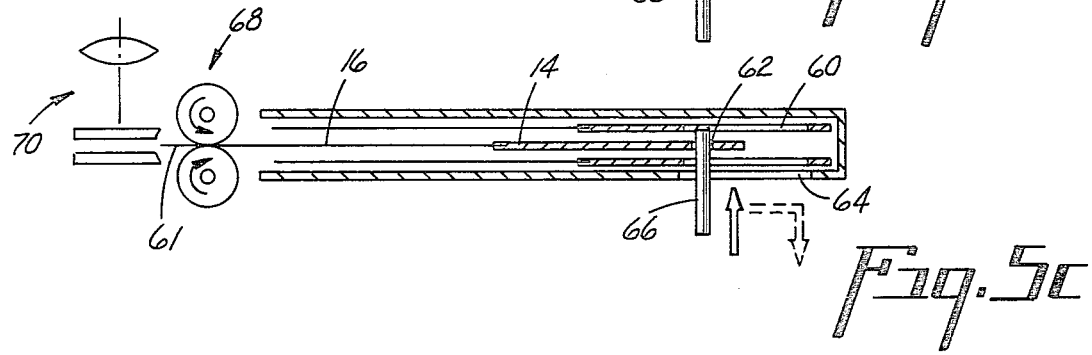

When it is desired to return the microfiche 16 from the viewing station 70 to the magazine 12, the rollers advance the microfiche in the opposite direction to partially restore the microfiche carrier assembly in the deck, and the interposer means 66 is again moved into the perforation 62 as shown in FIG. 5C, whereafter the interposer means 66 is moved in a direction to fully restore the microfiche carrier 10 in the magazine 12. With the microfiche carrier assembly restored, the interposer means 66 is withdrawn from the carrier assembly and the magazine, and the apparatus is in condition for a subsequent operation.

From the foregoing, it will be appreciated that the present invention provides an improved microfiche carrier assembly including selector means for retrieval of a selected microfiche from the magazine. The selector means provides increased useful life to the microfiche carrier assembly because, unlike prior art devices, it is not subject to the forces necessarily exerted against flimsy coding tabs to partially eject the microfiche from the deck in the magazine. Further, the invention provides for the construction of a relatively thin microfiche carrier assembly which affords improved and increased packing density of the carrier assemblies in the magazine.

What is claimed is:

1. A microfiche carrier, comprising:
    a core of flexible but relatively rigid sheet material having a pair of faces and a first and a second end;
    a thin cover sheet secured to the core and extending beyond said second end of the core to provide at least one flap overhanging the second end for receiving an edge of a microfiche; and
    carrier selector means comprising a plurality of parallel, elongate slots in said cover sheet, a like plurality of elongate slots in said core in registration with the slots in said cover sheet, and a single perforation at a predetermined location in said cover sheet and core distinct from the locations of said slots.

2. A microfiche carrier as set forth in claim 1 in which the first end of the core is enclosed by the cover sheet to provide a formed radius therearound.

3. A microfiche carrier as set forth in claim 1, the cover sheet further comprising an adhesive surface facing inwardly on the flap for receiving and securing the edge of the microfiche adjacent said second end of the core.

4. A microfiche carrier as set forth in claim 3, the cover sheet further comprising a second flap over hanging said second end and including an inwardly facing adhesive surface thereon for defining with said first-mentioned flap a pocket for receiving the edge of a microfiche.

5. A microfiche carrier as set forth in claim 4 further comprising means in releasable contact with the adhesive surfaces of the flaps to prevent offset of the adhesive prior to securing an edge of a microfiche to the carrier and adapted to be removed at the time a microfiche is to be secured to the carrier.

6. A microfiche carrier as set forth in claim 4 further comprising a microfiche positioned with an edge thereof in the pocket and secured therein by the flaps to provide a microfiche carrier assembly.

7. A microfiche carrier as set forth in claim 5 said cover sheet and core including at least one flexible leg having a detent means in one edge thereof.

8. A microfiche carrier as set forth in claim 7 in which the flexible leg is formed by a key-hole slot configuration for providing sufficient flexibility to the leg to permit a complimentary detent means on a suitable magazine to engage the detent means on the flexible leg.

9. In a deck comprising a plurality of microfiche carrier assemblies arranged in a stack, each microfiche carrier assembly of the type including a carrier having a rigid core and a thin cover sheet secured to the core having at least one end extending beyond boundaries of the core to define a flap for receiving a microfiche, an improved selector means associated with each microfiche carrier assembly for selecting any one of said assemblies from said deck, the improvement comprising:
- a plurality of through slots in each carrier, said slots equal in number to one less than the number of assemblies in said deck, said slots being disposed in registration with complementary slots in the other carrier in said deck; and
- a perforation in each carrier at a predetermined position different from the position of the perforation associated with each of the other carriers in the deck, and in registration with the complementary slots in said other carriers.

* * * * *